(12) United States Patent
Flosbach et al.

(10) Patent No.: US 8,685,497 B2
(45) Date of Patent: Apr. 1, 2014

(54) LIQUID COATING COMPOSITION

(75) Inventors: Carmen Flosbach, Wuppertal (DE); Gerhard Friederichs, Wuppertal (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 0 days.

(21) Appl. No.: 13/638,973

(22) PCT Filed: May 5, 2011

(86) PCT No.: PCT/US2011/035296
§ 371 (c)(1),
(2), (4) Date: Oct. 2, 2012

(87) PCT Pub. No.: WO2011/140300
PCT Pub. Date: Nov. 10, 2011

(65) Prior Publication Data
US 2013/0022749 A1    Jan. 24, 2013

Related U.S. Application Data

(60) Provisional application No. 61/332,242, filed on May 7, 2010.

(51) Int. Cl.
*B05D 3/02*    (2006.01)

(52) U.S. Cl.
USPC ........ 427/385.5; 427/384; 523/211; 524/590; 524/591

(58) Field of Classification Search
None
See application file for complete search history.

(56) References Cited

U.S. PATENT DOCUMENTS

| | | | |
|---|---|---|---|
| 2001/0007881 A1* | 7/2001 | Bitler et al. | 523/136 |
| 2009/0035471 A1* | 2/2009 | Flosbach et al. | 427/379 |
| 2009/0053421 A1* | 2/2009 | Flosbach et al. | 427/386 |
| 2009/0285992 A1* | 11/2009 | Flosbach et al. | 427/379 |
| 2009/0317552 A1* | 12/2009 | Flosbach et al. | 427/385.5 |
| 2011/0200756 A1* | 8/2011 | Flosbach et al. | 427/379 |
| 2011/0237742 A1* | 9/2011 | Flosbach et al. | 524/590 |
| 2012/0308730 A1* | 12/2012 | Renkes et al. | 427/385.5 |
| 2013/0004672 A1* | 1/2013 | Flosbach | 427/385.5 |

* cited by examiner

*Primary Examiner* — Erma Cameron
(74) *Attorney, Agent, or Firm* — Ingrassia Fisher & Lorenz, P.C.

(57) ABSTRACT

A liquid coating composition which contains (i) a resin system crosslinkable under catalysis of a catalyst D and comprising a binder A and, as an optional component, a crosslinker B for the binder A, and (ii) solid particles CD consisting of a physical mixture of 70 to 99 wt.-% of a polyurethane resin C and 1 to 30 wt.-% of a catalyst D immobilized in said polyurethane resin C, wherein the sum of the wt.-% totals 100 wt.-%, and wherein the polyurethane resin C has a melting temperature of 40 to 180° C., measured by DSC at a heating rate of 10 K/min.

12 Claims, No Drawings

LIQUID COATING COMPOSITION

This application is the National Stage Application of PCT/US2011/35296, filed May 05, 2011, which claims benefit of U.S. provisional Ser. No. 61/332,242, filed May 07, 2010.

FIELD OF THE INVENTION

The invention relates to a liquid coating composition which contains a crosslinkable binder, optionally, a crosslinker (curing agent, hardener) for the binder and solid particles consisting of a physical mixture of a polyurethane resin and a cure catalyst.

DESCRIPTION OF THE PRIOR ART

WO 2007/035876 A1 and WO 2007/081846 A2 disclose non-aqueous, liquid coating compositions which contain a hydroxyl-functional polyurethane binder which is present in the coating compositions as particles having a melting temperature of 40 to 180° C.

WO 2007/067432 A1 discloses non-aqueous, liquid coating compositions which contain a polyurethane resin with blocked isocyanate groups which is present in the coating compositions as particles having a melting temperature of 40 to 160° C.

SUMMARY OF THE INVENTION

The invention is directed to a liquid coating composition which contains (i) a resin system crosslinkable under the catalysis of a catalyst D and comprising a binder A and, as an optional component, a crosslinker B for the binder A, and (ii) solid particles CD consisting of a physical mixture of 70 to 99 wt.-% (weight-%) of a polyurethane resin C and 1 to 30 wt.-% of a catalyst D immobilized in said polyurethane resin C, wherein the sum of the wt.-% totals 100 wt.-%, and wherein the polyurethane resin C has a melting temperature of 40 to 180° C., in particular, 60 to 160° C., measured by DSC (differential scanning calorimetry) at a heating rate of 10 K/min.

DETAILED DESCRIPTION OF THE EMBODIMENTS

The coating composition according to the invention is a liquid aqueous or non-aqueous coating composition.

The solids content of the coating composition consists of its resin solids content, the solid particles CD consisting of the polyurethane resin C and the catalyst D, and the following optional components: pigments, fillers (extenders) and further non-volatile additives. The polyurethane resin C is not counted as part of the resin solids; rather, it and the catalyst D are counted as non-volatile additives.

The resin solids (the solids contribution of the resin system) of the coating composition comprises binder solids comprising at least the binder A and, optionally, crosslinker solids comprising at least the crosslinker B. If the resin solids comprise not only binder solids but also crosslinker solids, their weight ratio is, for example, 50 to 90 wt.-% of binder solids: 10 to 50 wt.-% of crosslinker solids, wherein the sum of the wt.-% totals 100 wt.-%. The binder solids may consist of the binder A. The crosslinker solids may consist of the crosslinker B. The binder A may be a self-crosslinkable binder or an externally crosslinkable binder (binder which needs an external crosslinker for crosslinking). In case of a self-crosslinkable binder A the coating composition may contain a crosslinker B, whereas in case of an externally crosslinkable binder A the coating composition contains a crosslinker B.

Both, the binder A and the optionally contained crosslinker B are not present as solid particles in the liquid coating composition of the present invention.

Generally, the binder A is not a solid at room temperature, but, for example, a liquid material. It may be soluble in an organic solvent (mixture) and/or it is dilutable with water or a water/organic solvent mixture, for example, soluble or dispersible therein. Binders A soluble in an organic solvent (mixture) are present in dissolved form in non-aqueous coating compositions according to the invention which contain organic solvent(s). Water-dilutable binders A are present in dissolved or dispersed, for example, emulsified form in aqueous coating compositions according to the invention which optionally also contain organic solvent(s).

Generally, the crosslinker B is not a solid at room temperature, but, for example, a liquid material. It may be soluble in an organic solvent (mixture) and/or it is dilutable with water or a water/organic solvent mixture, for example, soluble or dispersible therein. Crosslinkers B soluble in an organic solvent (mixture) are present in dissolved form in non-aqueous coating compositions according to the invention which contain organic solvent(s). Water-dilutable crosslinkers B are present in dissolved or dispersed, for example, emulsified form in aqueous coating compositions according to the invention which optionally also contain organic solvent(s).

Water-dilutable binders A and water-dilutable crosslinkers B may obtain their water-dilutability by addition of external emulsifiers or they are water-dilutable because of an appropriate content of conventional hydrophilic groups. Examples of these are nonionic hydrophilic groups, such as polyethylene oxide units, and/or ionic groups or groups convertible into ionic groups. Such binders A and crosslinkers B may be converted into the aqueous phase by addition of water or by addition of neutralizing agent and water. The ionic groups or groups convertible into ionic groups comprise in particular anionic groups or groups convertible into anionic groups, such as carboxyl groups in an amount corresponding to an acid value of, for example, 10 to 50 mg of KOH per gram of binder A or of crosslinker B. Binders A and crosslinkers B containing carboxyl groups may, for example, be converted into the aqueous phase by mixing with water once their carboxyl groups have been neutralized with bases, such as ammonia, amines or aminoalcohols.

The binder A may be selected from various types of binder resins including, for example, polysiloxane, polyurethane, polyester and vinyl copolymer like, for example, (meth) acrylic copolymer resins.

The coating compositions of the present invention may be coating compositions that can be cured under acid catalysis. Here, the catalyst D is an acid catalyst. In an embodiment, such coating compositions comprise self-crosslinkable binders A curable by acid-catalyzed self-condensation of appropriate functional groups. In another embodiment, they comprise a resin system comprising an externally crosslinkable binder A and a crosslinker B for the binder A, wherein the resin system is curable by an acid-catalyzed crosslinking reaction between the functional groups of the externally crosslinkable binder A and the functional groups of the crosslinker B reactive with the functional groups of the binder A.

Examples of self-crosslinkable binders A curable by acid-catalyzed self-condensation are those binders having alkoxysilane and/or silanol groups, binders having alkoxymethylamino groups and/or N-methylol groups and binders having hydroxyl groups and alkoxymethylamino groups and/or N-methylol groups.

Two particular examples of coating compositions according to the invention which are crosslinkable under acid catalysis and which contain an externally crosslinkable binder A and a crosslinker B for the binder A are distinguished by containing (i) a combination of a hydroxyl-functional binder A with an aminoplast crosslinker B or (ii) a combination of a hydroxyl-functional binder A with a free polyisocyanate crosslinker B.

It is also possible that the coating compositions of the present invention are coating compositions curable under organotin catalysis. Here, the catalyst D is an organotin catalyst. In an embodiment, such coating compositions comprise self-crosslinkable binders A curable by organotin-catalyzed self-condensation of appropriate functional groups. In another embodiment, such coating compositions comprise a resin system comprising an externally crosslinkable binder A and a crosslinker B for the binder A, wherein the resin system is curable by an organotin-catalyzed crosslinking reaction between the functional groups of the externally crosslinkable binder A and the functional groups of the crosslinker B reactive with the functional groups of the binder A.

Examples of self-crosslinkable binders A curable by organotin-catalyzed self-condensation are those binders having hydroxyl groups and blocked isocyanate groups.

An example of a coating composition according to the invention being crosslinkable under organotin catalysis and containing an externally crosslinkable binder A and a crosslinker B for the binder A is distinguished by containing a combination of a hydroxyl-functional binder A with a free or blocked polyisocyanate crosslinker B.

The hydroxyl-functional binders A comprise conventional hydroxyl-functional binders known to the person skilled in the art and are readily available commercially or may be prepared by conventional synthesis procedures. Examples are polyester resins, polyurethane resins and vinyl copolymer resins like (meth)acrylic copolymer resins, in each case with hydroxyl values of, for example, 60 to 300 mg of KOH/g and number-average molar masses of, for example, 500 to 10000.

All number-average molar mass data stated in the present description and the claims are number-average molar masses determined or to be determined by gel permeation chromatography (GPC; divinylbenzene-crosslinked polystyrene as the immobile phase, tetrahydrofuran as the liquid phase, polystyrene standards).

Aminoplast crosslinkers (resinous amine/aldehyde condensate crosslinkers) are well-known to the person skilled in the art of paint and coatings.

The amine/aldehyde condensates are widely used as crosslinkers in the field of paint and coatings. Examples of amine/aldehyde condensates which may be partly or fully etherified comprise, in particular, urea/formaldehyde condensate resins, benzoguanamine/formaldehyde condensate resins and melamine/formaldehyde condensate resins. Such amine/formaldehyde condensate resins are commercially available from various manufacturers in a huge number of types regarding condensation degree and type and degree of etherification.

Free polyisocyanate crosslinkers are readily available commercially and are also well-known to the person skilled in the art of paint and coatings. Free polyisocyanates are widely used as crosslinkers in the field of two-component paint and coatings. Examples of free polyisocyanates include diisocyanates and polyisocyanates having on average more than two free isocyanate groups per molecule. Examples of diisocyanates include hexamethylene diisocyanate, tetramethylxylylene diisocyanate, isophorone diisocyanate, dicyclohexylmethane diisocyanate, cyclohexane diisocyanate, toluylene diisocyanate and diphenylmethane diisocyanate. Examples of polyisocyanates having on average more than two free isocyanate groups per molecule are those which contain heteroatoms in the residue linking the isocyanate groups. Examples of these are polyisocyanates which contain carbodiimide groups, allophanate groups, isocyanurate groups, uretidione groups, urethane groups, acylated urea groups or biuret groups, for example, polyisocyanates of the uretidione or isocyanurate type produced by di- or trimerization of the above-mentioned diisocyanates. Further examples are polyisocyanates produced by reaction of the above-mentioned diisocyanates with water and containing biuret groups or polyisocyanates produced by reaction with polyols and containing urethane groups. Particular examples are "coating polyisocyanates" based on hexamethylene diisocyanate, isophorone diisocyanate or dicyclohexylmethane diisocyanate; "coating polyisocyanates" based on these diisocyanates means the per se known biuret, urethane, uretidione and/or isocyanurate group-containing derivatives of these diisocyanates.

Examples of blocking agents which may be used to block the isocyanate groups of free isocyanate crosslinkers are well-known to the skilled person and they include alcohols, ketoximes like butanone oxime, phenols, NH-group containing amines and nitrogen heterocycles like ε-caprolactame and pyrazole derivatives.

As already mentioned, the coating composition of the present invention contains solid particles CD consisting of a physical mixture of 70 to 99 wt.-%, in particular 75 to 95 wt.-% of a polyurethane resin C and 1 to 30 wt.-%, in particular 5 to 25 wt.-% of a catalyst D immobilized in said polyurethane resin C, wherein the sum of the respective wt.-% totals 100 wt.-%. The solid particles CD behave like a latent cure catalyst, since catalyst D is immobilized in polyurethane resin C and is thus not or virtually not able to display its catalytic effect on the crosslinking reaction of the resin system of the coating composition of the present invention.

The polyurethane resin C has a melting temperature of 40 to 180° C., in particular, 60 to 160° C., measured by DSC at a heating rate of 10 K/min. Said melting temperatures are not in general sharp melting points, but instead the upper end of melting ranges with a breadth of, for example, 30 to 150° C. To avoid misunderstandings, the term "upper end of a melting range" shall mean the end temperature $T_{SE}$ as defined in German Industry Standard DIN 53765 (issue March 1994). The melting ranges and thus, the melting temperatures are determined by DSC at heating rates of 10 K/min.

The polyurethane resin C is insoluble or virtually insoluble in the coating composition of the present invention. It is only very slightly, if at all, soluble in organic solvents and/or in water. Its solubility can amount, for example, to less than 10, in particular less than 5 g per liter of butyl acetate or water at 20° C. The solubility can be determined by preparing a saturated solution of the polyurethane resin C with a precipitate of the latter at 20° C., followed by filtering off and gravimetrically determining the non-dissolved portion of polyurethane resin C.

The polyurethane resin C is typically selected from the group consisting of hydroxyl-functional polyurethanes and polyurethanes with blocked isocyanate groups. Hydroxyl-functional polyurethane resins C are not to be confused with hydroxyl-functional polyurethane resins A. Polyurethanes C with blocked isocyanate groups are not to be confused with blocked polyisocyanate crosslinkers B.

Hydroxyl-functional polyurethane resins C have hydroxyl values, of, for example, 50 to 300 mg KOH/g. Hydroxyl-functional polyurethane resins of the C type and methods for their production are known to the person skilled in the art; in particular, they may be produced by reacting polyisocyanate(s) with polyol(s) in excess. Polyols suitable for the production of the hydroxyl-functional polyurethane resins C are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred. The person skilled in the art selects the nature and proportion of the polyisocyanates and polyols for the production of hydroxyl-functional polyurethane resins C in such a manner that hydroxyl-functional polyurethane resins C with the above-mentioned melting temperatures and the above-mentioned solubility behavior are obtained.

The hydroxyl-functional polyurethane resins C may be produced in the presence of a suitable organic solvent (mixture), which, however, makes it necessary to isolate the hydroxyl-functional polyurethane resins obtained in this manner or remove the solvent therefrom. Preferably, the production of the hydroxyl-functional polyurethane resins C is, however, carried out without solvent and without subsequent purification operations.

With respect to specific embodiments of hydroxyl-functional polyurethane resins of the C type and methods for their production explicit reference is made to the disclosure of WO 2007/035876 A1 and WO 2007/081846 A2 for brevity reasons.

Polyurethane resins C with blocked isocyanate groups have a latent isocyanate content in the range of, for example, 2 to 21.2 wt.-%, calculated as NCO (molar mass 42) and relative to the corresponding underlying polyurethane resin, i.e., which is free of blocking agent. Polyurethane resins C with blocked isocyanate groups are also known to the person skilled in the art; in particular, they may be produced by reacting polyol(s) with polyisocyanate(s) in excess and reacting the excess free isocyanate groups with one or more monofunctional blocking agents. Polyols suitable for the production of the polyurethane resins C with blocked isocyanate groups are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred. The person skilled in the art selects the nature and proportion of the polyisocyanates, the polyols and the blocking agents for the production of polyurethane resins C with blocked isocyanate groups in such a manner that polyurethane resins C with blocked isocyanate groups and with the above-mentioned melting temperatures and the above-mentioned solubility behavior are obtained.

The polyurethane resins C with blocked isocyanate groups may be produced in the presence of a suitable organic solvent (mixture), which, however, makes it necessary to isolate the polyurethane resins C with blocked isocyanate groups obtained in this manner or remove the solvent therefrom. Preferably the production of the polyurethane resins C with blocked isocyanate groups is, however, carried out without solvent and without subsequent purification operations.

With respect to specific embodiments of polyurethane resins of the C type with blocked isocyanate groups and methods for their production explicit reference is made to the disclosure of WO 2007/067432 A1 for brevity reasons.

As already mentioned, the coating composition of the present invention is a coating composition that can be cured under catalysis of a catalyst D which is present in the coating composition in immobilized form, i.e. forming part of the solid particles CD comprised of the physical mixture of polyurethane resin C and catalyst D.

In the embodiment of a coating composition that can be cured under acid catalysis, catalyst D is an acid catalyst, in particular a sulfonic acid catalyst like p-toluenesulfonic acid.

In the embodiment of a coating composition that can be cured under organotin catalysis, catalyst D is an organotin catalyst, in particular a diorganotin catalyst like dibutyltin dilaurate, dibutyltin diacetate, dibutyltin oxide or dioctyltin oxide.

The physical mixture of polyurethane resin C and catalyst D can be prepared by mixing the catalyst D into a melt of polyurethane resin C, provided the mixing conditions do not allow for a chemical reaction between components C and D. In other words, components C and D are chemically inert towards each other and/or the mixing conditions, in particular the mixing temperature, are selected accordingly. Once the mixture of components C and D is homogenized, the mixture is cooled under agitation and allowed to solidify. To avoid misunderstandings, "homogenized" shall mean that catalyst D is "evenly distributed" within the polyurethane resin C, i.e., dependent on the nature of catalyst D, the solidified physical mixture may form a homogeneous phase (even on a microscopical level) or a multi-phase system, for example, a dispersion of D-particles evenly distributed in a continuous phase of polyurethane resin C. The solidified physical mixture of polyurethane resin C and catalyst D can be comminuted, for example, ground to form solid particles CD.

The solid particles CD have, in particular, a non-spherical shape. The average particle size (mean particle diameter) determined by means of laser diffraction is, for example, 1 to 100 μm. The particles CD may be formed by grinding (milling) of the solidified physical mixture CD; for example, conventional powder coat production technology may be used for that purpose.

The solid particles CD are insoluble or virtually insoluble in the coating composition of the present invention; it is believed that their poor solubility results from the already mentioned solubility properties of the polyurethane resin C forming the predominant part of the solid particles CD.

The solid particles CD are contained in the coating composition in an amount that is effective in catalyzing the crosslinking mechanism of the coating composition under the conditions of thermal cure, or to be more precise, in catalyzing (i) the self-crosslinking reaction of a self-crosslinkable binder A or (ii) the self-crosslinking reaction of a self-crosslinkable binder A and, simultaneously, the additional crosslinking reaction between the self-crosslinkable binder A and a crosslinker B or (iii) the crosslinking reaction between an externally crosslinkable binder A and a crosslinker B, in each case under the curing conditions. The solid particles CD are contained in the coating composition in a proportion of, for example, 1 to 10 wt.-%, relative to the resin solids of the coating composition; the skilled person will select the proportion of the solid particles CD within said range dependent on the type and content of the catalyst D in the polyurethane resin C and the reactivity of the coating composition's crosslinking system.

The catalyst D or the solid particles CD do not or virtually not (only marginally) catalyze said crosslinking reactions under storage and application conditions of the coating composition of the present invention. In other words, the catalyst D or the solid particles CD behave essentially passive as long as the temperature is not raised to or above the melting temperature of polyurethane resin C, what happens under the conditions of thermally curing a coating applied from the coating composition. In still other words, as long as the polyurethane resin C is not melted and the catalyst D is not released, the latter does not or virtually not display its catalytic activity.

In case of a non-aqueous coating composition, the solid particles CD may be combined in any suitable manner, for example, either by stirring or mixing as a ground powder, into the liquid coating composition or into liquid constituents thereof, wherein it is possible subsequently to perform additional wet grinding or dispersing of the particles CD. The subsequent grinding or dispersing may be done, for example, by means of a bead mill, in the resultant suspension. In case of an aqueous coating composition, the particles CD are, in particular, present within the generally aqueously dispersed binder A phase or binder A containing phase respectively. Here it is preferred to stir or mix the solid particles CD as a ground powder into the water-dilutable binder A not yet converted into the aqueous phase, wherein it is possible subsequently to perform additional wet grinding or dispersing of the particles CD, for example, by means of a bead mill, in the resultant suspension which thereafter is converted into the aqueous phase by dilution with water.

The coating composition of the present invention contains water and/or organic solvent(s) and it has a solids content of, for example, 35 to 75 wt.-%, preferably of 40 to 65 wt.-%. In case of a non-aqueous coating composition the organic solvent content is, for example, 25 to 65 wt.-%, preferably, 35 to 60 wt.-%; the sum of the wt.-% of the solids content and the organic solvent content is here, for example, 90 to 100 wt.-% (any possible difference in the corresponding range of above 0 to 10 wt.-% to make up to the total of 100 wt.-% is in general formed by volatile additives). In case of an aqueous coating composition the organic solvent content is, for example, 0 to 20 wt.-%. The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, (iso)propanol, butanol; N-alkyl pyrrolidones, such as, N-methyl pyrrolidone; aromatic hydrocarbons, such as, xylene, Solvesso® 100 (mixture of aromatic hydrocarbons with a boiling range from 155° C. to 185° C.), Solvesso® 150 (mixture of aromatic hydrocarbons with a boiling range from 182° C. to 202° C.) and aliphatic hydrocarbons.

Apart from the solid particles CD which are counted as non-volatile additive, the coating composition may contain further conventional coating additives, for example, emulsifiers, neutralizing agents, levelling agents, wetting agents, anticratering agents, antioxidants and/or light stabilizers. The additives are used in conventional amounts known to the person skilled in the art.

The coating composition may also contain transparent pigments, color-imparting and/or special effect-imparting pigments and/or fillers, for example, corresponding to a ratio by weight of pigment plus filler: resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, and coated silicon dioxide pigments. Examples of fillers are silicon dioxide, aluminum silicate, barium sulfate, calcium carbonate and talc.

The coating compositions according to the invention containing the solid particles CD are distinguished by an unimpaired storage stability (one component coating compositions) or an unimpaired pot life (multi-component coating compositions) compared to similar coating compositions which do not contain the particles CD. In other words, the presence of the particles CD does not significantly or negatively influence storage stability or pot life of the coating compositions. Pot life is the time within which, once the mutually reactive components of a coating composition have been mixed, the coating composition may still be properly processed or applied and coatings of unimpaired quality can be achieved.

The coating compositions of the present invention may be used for the production of single-layer coatings or for the production of one or more coating layers within a multilayer coating, such as, in particular, an automotive multilayer coating, either on an automotive body or on an automotive body part. This may relate to both original and repair coating applications.

Thus, the present invention also relates to a process for the production of a coating layer on a substrate, comprising the steps:

1) applying a coating layer from a coating composition of the present invention on a substrate, and
2) thermally curing the coating layer at an object temperature at or above the melting temperature of the polyurethane resin C.

The coating composition may be applied by means of conventional application methods, in particular, by spraying onto any desired uncoated or precoated substrates, for example, of metal or plastics.

In step 2) of the process of the present invention the coating layer applied in step 1) is thermally cured (i) by the D-catalyzed self-crosslinking reaction of the self-crosslinkable binder A or (ii) by the D-catalyzed self-crosslinking reaction of the self-crosslinkable binder A and, simultaneously, the also D-catalyzed additional crosslinking reaction between the self-crosslinkable binder A and the crosslinker B or (iii) the D-catalyzed crosslinking reaction between the externally crosslinkable binder A and the crosslinker B. Thermal curing proceeds at object temperatures at or above the melting temperature of the polyurethane resin C, for example, at >40 to 200° C., preferably, >60 to 180° C., for example, by baking. Under said thermal curing conditions the catalyst D is released from the solid particles CD and displays its catalytic activity in terms of accelerating the crosslinking reaction compared to working with the uncatalyzed coating composition. By using the particles CD in the coating composition it is also possible to reduce the required object temperature during bake curing, provided that the object temperature lies at or above the melting temperature of polyurethane resin C.

EXAMPLES

Examples 1a to 1c

Preparation of Polyurethane Polyols

Polyurethane polyols were produced by reacting HDI (1,6-hexane diisocyanate) or a mixture of HDI and DCMDI (dicyclohexylmethane diisocyanate) with a mixture of GLY (glycerol) and one or more diols in accordance with the following general synthesis method:

The one or more polyols were initially introduced into a 2 liter four-necked flask equipped with a stirrer, thermometer and column and 0.01 wt.-% DBTL (dibutyltin dilaurate), relative to the initially introduced quantity of polyol(s), were added. The mixture was heated to 80° C. HDI or a HDI/DCMDI mixture was then apportioned and a temperature was maintained so that the hot reaction mixture did not solidify. The reaction mixture was stirred until no free isocyanate could be detected (NCO content <0.1%). The melting behavior of the resultant polyurethanes was investigated by means of DSC (differential scanning calorimetry, heating rate 10 K/min).

Examples 1a to 1c are shown in Table 1. The Table states which reactants were reacted together in what molar ratios and the final temperature of the melting process measured by DSC is stated in ° C.

TABLE 1

| Ex. | Mols HDI | Mols DCMDI | Mols diol A | Mols Diol B | Mols GLY | FT |
|---|---|---|---|---|---|---|
| 1a | 2 |  | 1 PENT | 1 HEX | 1 | 101° C. |
| 1b | 1.8 | 0.2 | 2 HEX |  | 1 | 109° C. |
| 1c | 1.5 | 0.5 | 2 HEX |  | 1 | 117° C. |

FT; final temperature of the melting process
HEX: 1,6-hexanediol
PENT: 1,5-pentanediol Examples 2a to 2c Preparation of Latent Acid Catalysts Examples 1a to 1c were repeated and directly after conclusion of the synthesis p-TSA (p-toluenesulfonic acid) in an amount of 10 wt.-%, relative to the molten polyurethane resin, was added into the molten polyurethane resin, homogenized for 15 minutes and the resins were then in each case discharged and allowed to cool and solidify.

Example 2d

Preparation of a Latent Organotin Catalyst

Example 1a was repeated and directly after conclusion of the synthesis DBTL in an amount of 5 wt.-%, relative to the molten polyurethane resin, was added into the molten polyurethane resin, homogenized for 15 minutes and the resin was then discharged and allowed to cool and solidify.

Example 3

Preparation of an Uncatalyzed One-Component Clear Coat Composition

The following components were mixed:
57.6 pbw (parts by weight) of a solution of a hydroxyl-functional methacrylic binder resin in a 34 pbw:4 pbw mixture of Solvesso® 100 and n-butanol (solids content 62 wt.-%; copolymer of 1 pbw of acrylic acid, 6.1 pbw of butyl acrylate, 5 pbw of hydroxypropyl methacrylate, 5 pbw of isobutyl methacrylate, 7.5 pbw of hydroxyethyl acrylate, 10 pbw of styrene, 10 pbw of t-butyl methacrylate, 16.6 pbw of butyl methacrylate),
14.4 pbw Cymel® 301 (melamine crosslinker),
5.0 pbw butyl diglycol acetate,
5.0 pbw butyl diglycol,
8.0 pbw butyl glycol,
10.0 pbw ethoxypropyl acetate.

Example 4

Preparation of a Clear Coat Composition Containing an Acid Catalyst

Example 3 was repeated and 0.6 pbw of p-TSA were mixed into the mixture.

Examples 5a to 5c

Preparation of Clear Coat Compositions Containing a Latent Acid Catalyst

The latent acid catalysts 2a to 2c were comminuted, ground and sieved by means of grinding and sieving methods conventional for the production of powder coatings and, in this manner, converted into powders with an average particle size of 50 µm (determined by means of laser diffraction).

6 pbw of the pulverized latent acid catalysts 2a to 2c were mixed into 100 pbw of the clear coat composition of Example 3 in each case.

The storage stability of the clear coat compositions of Examples 3, 4 and 5a to 5c was tested by storing at 40° C. for 15 days. The clear coat compositions were also applied onto glass plates by means of a doctor blade (doctor blade 9), flashed off for 10 minutes and then baked for 20 minutes at 140° C.

Table 2 shows technological properties of the clear coat compositions.

TABLE 2

| Clear coat | Catalyst | Storage stability | Coating appearance after baking |
|---|---|---|---|
| 3 | ./. | 2% increase in viscosity | clear and glossy but tacky film |
| 4 | p-TSA | 112% increase in viscosity | clear, glossy and tack-free film |
| 5a | 2a | 5% increase in viscosity | clear, glossy and tack-free film |
| 5b | 2b | 4% increase in viscosity | clear, glossy and tack-free film |
| 5c | 2c | 8% increase in viscosity | clear, glossy and tack-free film |

Example 6

Preparation of an Uncatalyzed Two-Component Clear Coat Composition

The following components were mixed to form a clear coat base:
70 pbw of a solution of a hydroxyl-functional methacrylic binder resin in a 34 pbw:4 pbw mixture of Solvesso® 100 and n-butanol (solids content 62 wt.-%; copolymer of 1 pbw of acrylic acid, 6.1 pbw of butyl acrylate, 5 pbw of hydroxypropyl methacrylate, 5 pbw of isobutyl methacrylate, 7.5 pbw of hydroxyethyl acrylate, 10 pbw of styrene, 10 pbw of t-butyl methacrylate, 16.6 pbw of butyl methacrylate),
18 pbw Solvesso® 100,
12 pbw butyl acetate.

The clear coat base was mixed with Desmodur® N3390 (polyisocyanate crosslinker) in a stoichiometric ratio OH/NCO=1:1 prior to application of the two-component clear coat composition so formed.

Example 7

Preparation of a Clear Coat Composition Containing an Organotin Catalyst

Example 6 was repeated and 0.05 pbw of DBTL were mixed into 100 pbw of the two-component clear coat composition.

Example 8

Preparation of a Clear Coat Composition Containing a Latent Organotin Catalyst The latent organotin catalyst 2d was comminuted, ground and sieved by means of grinding and sieving methods conventional for the production of powder coatings and, in this manner, converted into a powder with an average particle size of 50 μm (determined by means of laser diffraction).

1 pbw of the pulverized latent organotin catalyst 2d was mixed into 100 pbw of the two-component clear coat composition of Example 6.

The pot life at 23° C. of the two-component clear coat compositions of Examples 6 to 8 was tested. The clear coat compositions were also applied onto glass plates by means of a doctor blade (doctor blade 9), flashed off for 10 minutes and then baked for 20 minutes at 140° C.

Table 3 shows technological properties of the clear coat compositions.

TABLE 3

| Clear coat | Catalyst | Pot life at 23° C. | Coating appearance after baking | Koenig pendulum hardness of baked clear coat after 1 day aging (seconds) |
|---|---|---|---|---|
| 6 | ./. | 100% viscosity increase within 134 min after mixing | clear, glossy and tack-free film | 115 |
| 7 | DBTL | 100% viscosity increase within 58 min after mixing | clear, glossy and tack-free film | 151 |
| 8 | 2d | 100% viscosity increase within 117 min after mixing | clear, glossy and tack-free film | 147 |

What is claimed is:

1. A liquid coating composition which contains (i) a resin system crosslinkable under catalysis of a catalyst D and comprising a binder A and, as an optional component, a crosslinker B for the binder A, and (ii) solid particles CD consisting of a physical mixture of 70 to 99 wt.-% of a polyurethane resin C and 1 to 30 wt.-% of a catalyst D immobilized in said polyurethane resin C, wherein the sum of the wt.-% totals 100 wt.-%, and wherein the polyurethane resin C has a melting temperature of 40 to 180° C., measured by DSC at a heating rate of 10 K/min.

2. The coating composition of claim 1 containing water and/or organic solvent(s) and having a solids content of 35 to 75 wt.-%, wherein the solids content consists of the resin solids content, the solid particles CD and optional components: pigments, fillers and non-volatile additives.

3. The coating composition of claim 1, wherein the polyurethane resin C is selected from the group consisting of hydroxyl-functional polyurethanes and polyurethanes with blocked isocyanate groups.

4. The coating composition of claim 1, wherein the average particle size of the solid particles CD is 1 to 100 μm.

5. The coating composition of claim 1, wherein the solid particles CD are contained in a proportion of 1 to 10 wt.-%, relative to the resin solids of the coating composition.

6. The coating composition of claim 1, wherein the coating composition is curable under acid catalysis and wherein the catalyst D is an acid catalyst.

7. The coating composition of claim 1, wherein the coating composition is curable under organotin catalysis and wherein the catalyst D is an organotin catalyst.

8. The coating composition of claim 6, wherein the binder A is a hydroxyl-functional binder and wherein the crosslinker B is selected from the group consisting of aminoplast crosslinkers and free polyisocyanate crosslinkers.

9. The coating composition of claim 7, wherein the binder A is a hydroxyl-functional binder and wherein the crosslinker B is a free or blocked polyisocyanate crosslinker.

10. The coating composition of claim 1, wherein the melting temperature of the polyurethane resin C is from 60 to 160° C.

11. The coating composition of claim 1, wherein the solubility of the polyurethane resin C is less than 10 g per liter of butyl acetate or water at 20° C.

12. A process for the production of a coating layer on a substrate, comprising the steps:
1) applying a coating layer from a coating composition of claim 1 on a substrate, and
2) thermally curing the coating layer at a temperature at or above the melting temperature of the polyurethane resin C.

* * * * *